March 9, 1954  J. R. BALLEW  2,671,685
MAGNETIC FISHING TOOL
Filed Oct. 12, 1951
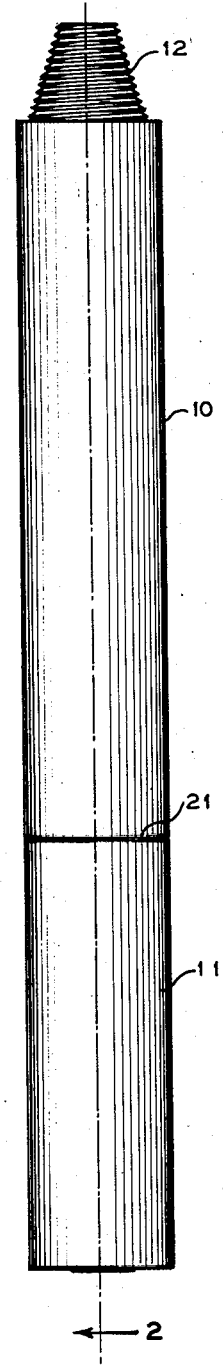
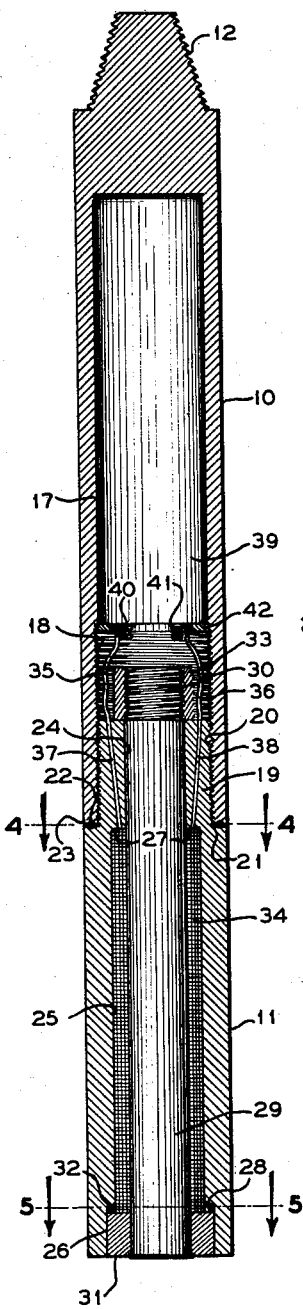
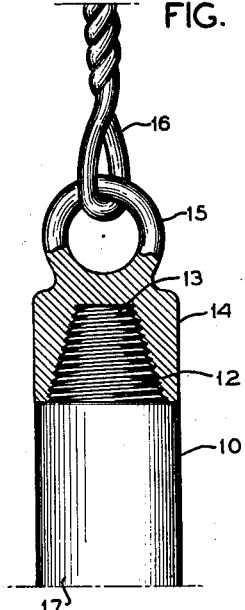
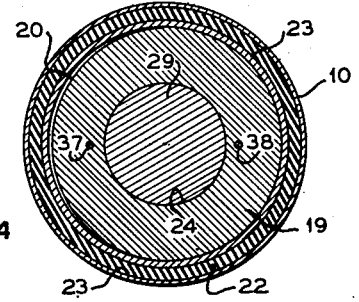
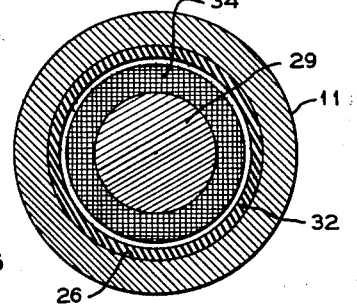
INVENTOR.
J. R. BALLEW
BY
*A. Yates Dowell*
ATTORNEY Patented Mar. 9, 1954

2,671,685

UNITED STATES PATENT OFFICE 2,671,685

MAGNETIC FISHING TOOL

Julius R. Ballew, Hobbs, N. Mex.

Application October 12, 1951, Serial No. 251,003

3 Claims. (Cl. 294—65.5)

This invention relates to well drilling and the recovery of drilling equipment from oil and other types of relatively deep wells during and after drilling operations.

The invention is particularly directed to magnetic fishing equipment for recovering objects of a metallic nature including parts of drills or the like become detached and are dropped in the well as well as the recovery of metallic ores of various kinds.

Previous attempts have been made to provide magnetic fishing equipment as well as combination tools with metallic pick-up elements. These have not been completely satisfactory for numerous reasons including cost, bulkiness, vulnerability to damage, lack of durability, corrosion, loss of energy due to the exposure to water and oil and the length of the cables required to supply electrical energy, as well as leakage of the containers in which the electrical parts are contained.

It is an object of the invention to provide a self-contained sealed magnetic fishing tool which can be attached either to the conventional drill string or to an independent cable and which fishing tool is provided an electromagnet and a self-contained source of electrical energy or power supply.

A further object of the invention is to provide a tight electromagnetic unit with pressure tight seals permitting it to be lowered to a very substantial depth where pressures are relatively high without leakage into the unit which would promote failure of the electromagnet.

Further objects and advantages of the invention will be apparent from the following description taken in conjunction with the accompanying, wherein:

Fig. 1 is a side elevation illustrating one application of the invention;

Fig. 2, a longitudinal section on the line 2—2 of Fig. 1;

Fig. 3, a fragmentary detail of a modified suspension means;

Fig. 4, a section on the line 4—4 of Fig. 2; and

Fig. 5, a section on the line 5—5 of Fig. 2.

Briefly stated the invention comprises a two-part casing in one of which is carried the magnetic windings and in the other a dry cell battery for supplying electrical energy through such magnetic wirings. Between the sections of the casing is disposed a compressible gasket contained in a groove in one of the sections.

The extremity of the casing is closed by one section of the casing and the magnetic core between which is disposed a non-magnetic insulating ring of copper, brass or other substances. This ring is welded to the center core and is engageable against a sealing gasket which in turn rests against a shoulder within the end of the casing. The core of the magnet is axially movable by means of a nut threaded on the opposite end of the core and bearing against the end of the casing section.

With continued reference to the drawing, the magnetic fishing tool of the present invention comprises a casing of upper and lower casing sections 10 and 11, the casing section 10 having a solid upper end provided with a tapered threaded portion 12 for engagement with a well string (not shown) or with the internal threads 13 of a suspension cap 14 having a ring 15 for engagement by a cable 16.

The upper casing section 10 is provided with a bore 17 having internal threads 18 along the end portion of the same. The lower section 11 of the casing is provided with a reduced upper portion 19 of uniform external diameter with external threads 20 for cooperation with the internal threads 18 on the upper section 10 of the casing.

At the base of the reduced portion 19 there is a shoulder 21 against which the internally threaded extremity of the upper shell section abuts, such extremity being provided with an annular semi-circular recess 22 for the reception of an annular resilient and therefore compressible gasket 23 forming a tight seal between the casing or shell sections. The lower casing section has a bore 24, an enlarged bore 25, and a further enlarged portion 26 which structure provides shoulders 27 and 28.

A soft iron core 29 is provided of uniform diameter having threads 30 on its upper end. This core is of a size to form a snug fit within the upper end of the lower casing section. About the lower end portion of the core is mounted a non-magnetic ring 31 of an internal diameter to receive the core with a press fit and with an external diameter to form a snug fit within the bore 26 of the lower end of the casing section. This ring engages the gasket 32 which bears against the shoulder 28 of the lower casing section. This gasket prevents leakage into the lower casing section and axial force to compress the gasket is provided by means of a nut 33 engaging the threads 30 on the upper end of the core and with such nut bearing against the end of the lower casing section and when threaded along the core it will cause the core to move axially of the casing.

Within the bore 25 are magnet windings 34 terminating in conductors 35 and 36 which extend through channels 37 and 38 in the reduced threaded upper extremity of the lower casing section, thus providing an electromagnet. Such conductors form a means for the transmission of electrical energy to the windings of the magnet.

In order to provide electrical energy, a battery pack 39 may be accommodated within the bore 17 of the upper casing section in a manner similar to a conventional flashlight, such battery pack having terminals 40 and 41 to which the conductors 35 and 36 are connected, an externally threaded keeper ring 42 being employed for retaining the battery pack in fixed position.

Thus there is provided self-contained sealed magnetic fishing tool which consists of a minimum of parts, is susceptible of use on the end of a well string or by being otherwise suspended for picking up lost well drilling equipment, including drill bits and the like, as well as other metallic containing substances including metal bearing ores and the like. Also, the device of the present invention is durable, not susceptible to corrosion on account of the leakage of moisture into the same, is not likely to become separated after it has been lowered into a well. Further the battery may be easily replaced with a minimum of effort.

It will be obvious to those skilled in the art that various changes may be made in the invention without departing from the spirit and scope thereof and therefore this invention is not limited by that which is shown in the drawing or described in the specification but only as indicated in the appended claims.

What is claimed is:

1. A magnetic fishing tool comprising a shell having a smooth exterior composed of upper and lower sleeve sections, said upper sleeve section having its upper end closed and constructed with conical threads for quick attachment to a well string or other supporting structure and having its lower end internally threaded, said lower sleeve section having a reduced externally threaded upper end for attachment to said lower threaded end and having a shoulder at the base of the reduced portion for engaging the lower extremity of the upper sleeve section, conductor channels located longitudinally through a portion of the wall of said lower sleeve section, gasket means between said shoulder and the end of said upper shell member for sealing the joint therebetween, a core in the lower sleeve section having its upper end threaded, a nut on said last mentioned portion, said lower sleeve section having a bore at its upper end of a size to snugly receive said core, an intermediate bore of larger diameter and a further enlarged bore adjacent its lower end forming a shoulder, a ring of non-magnetic material about the lower end of said core fixed thereto in a manner to provide a tight joint therewith, the outer surface of said ring being snugly received within the lower end of said lower sleeve section, a sealing gasket between said ring and the adjacent shoulder of said lower sleeve section and adapted to be compressed when said nut is tightened, windings about said core in said intermediate bore terminating in conductors located in said channels, said upper sleeve member providing a container for a dry cell battery, and a threaded keeper ring for retaining said battery in position.

2. A magnetic fishing tool comprising a shell having a smooth exterior composed of upper and lower sleeve sections, said upper sleeve section having its upper end closed and constructed for quick attachment to a supporting structure and having its lower end threaded, said lower sleeve section having a threaded upper end for attachment to said lower threaded end and having a shoulder for engaging the lower extremity of the upper sleeve section, gasket means sealing the joint therebetween, a core in the lower sleeve section having its upper end threaded, said lower sleeve section having a bore at its upper end of a size to snugly receive said core, an intermediate bore of larger diameter and a further enlarged bore adjacent its lower end forming a shoulder, a ring of non-magnetic material about the lower end of said core fixed thereto in a manner to provide a tight joint therewith, the outer surface of said ring being snugly received within the lower end of said lower sleeve section, a sealing gasket between said ring and the adjacent shoulder of said lower sleeve section, windings about said core in said intermediate bore terminating in conductors, said upper sleeve member providing a container for a dry cell battery.

3. A magnetic fishing tool comprising upper and lower sleeve sections detachably secured together, a core axially disposed in said lower section with the lower end of said core terminating on substantially the same plane as the lower end of said lower section, a shoulder on the inner surface of said lower section spaced from the lower end thereof, a ring of non-magnetic material secured to said core, disposed within said lower section below said shoulder, a winding on said core within said lower section the upper end of said core being slidably received in a reduced bore in said lower section, a nut threadedly received on the upper end of said core and engaging the upper end of said lower section, whereby, upon rotation of said nut to draw said core upwardly, said ring will intimately engage said shoulder, said upper section serving as a container for a source of electric power for said winding.

JULIUS R. BALLEW.

References Cited in the file of this patent

UNITED STATES PATENTS

| Number | Name | Date |
|--------|------|------|
| 1,439,687 | Brandon | Dec. 26, 1922 |
| 1,589,678 | Borneman | June 26, 1926 |